UNITED STATES PATENT OFFICE.

CHARLES C. FIELDS, OF BRISTOL, TENNESSEE.

WELDING COMPOUND.

SPECIFICATION forming part of Letters Patent No. 313,716, dated March 10, 1885.

Application filed August 26, 1884. (No specimens.)

*To all whom it may concern:*

Be it known that I, CHARLES C. FIELDS, of Bristol, in the county of Sullivan and State of Tennessee, have invented a certain new and useful Welding Compound, of which the following is a specification.

The special object of the invention is to aid and facilitate the welding of cast-steel, although it is also applicable to the welding of iron.

In carrying out my invention I use the following ingredients or constituents in about the proportions named: sulphate of baryta, one part; prussiate of potash, one-sixteenth part; sal-ammoniac, one-eighth part.

The above ingredients are to be pulverized and mixed together. They may be ground separately and afterward mixed, or all ground together.

The compound is used in the same manner in which borax has heretofore been used, but the metal operated upon may be made much hotter than where borax is used without burning.

The use of my compound keeps the steel or iron free from burning, and if burned will restore it when applied. When used with steel, it serves to refine it and prepare it for tempering.

Heretofore in the use of borax great skill and experience have been necessary to effect good work, and the use of borax involves considerable expense.

The advantages of my invention over borax and other welding substances or compounds are derived from its greater effectiveness and cheapness and in the fact that it may be used by unskilled labor.

It has been found that one pound of my improved compound will do as much work as five pounds of borax.

The sulphate of baryta, forming one of the ingredients of my compound, is found as a natural rock in certain parts of this country.

I do not wish to limit my invention to the precise proportions above specified, as the quantity of prussiate of potash and sal-ammoniac used may be increased or decreased according to the quality of the steel to be operated on, less being required for steel of inferior quality than for steel of a higher grade. The amount of sulphate of baryta may also be varied.

This compound may be used for welding steel drills, tools, bars, &c., when broken, which has never been perfectly effected heretofore by the use of borax or other welding compounds.

Having described my invention, I claim—

A welding compound consisting of the following ingredients or constituents in about the proportions named: sulphate of baryta, one part; prussiate of potash, one-sixteenth part; sal-ammoniac, one-eighth part, the same being ground and mixed together for use, substantially as specified.

In testimony whereof I have hereunto set my hand and seal this 22d day of August, A. D. 1884.

C. C. FIELDS. [L. S.]

Witnesses:
A. S. MCNEIL,
SAM. W. RHEA.